United States Patent
Edmonds

(10) Patent No.: US 6,748,183 B2
(45) Date of Patent: Jun. 8, 2004

(54) PRINTER DRIVER USER INTERFACE AND SYSTEM

(75) Inventor: Johnathan A. Edmonds, Silverton, OR (US)

(73) Assignee: Xerox Corporation, Stamford, CT (US)

(*) Notice: Subject to any disclaimer, the term of this patent is extended or adjusted under 35 U.S.C. 154(b) by 116 days.

(21) Appl. No.: 10/082,478

(22) Filed: Feb. 22, 2002

(65) Prior Publication Data

US 2003/0161641 A1 Aug. 28, 2003

(51) Int. Cl.$^7$ ................................................ G03G 15/00
(52) U.S. Cl. .......................................... 399/23; 399/24
(58) Field of Search ............................... 399/8, 12, 13, 399/23, 24, 25, 27

(56) References Cited

U.S. PATENT DOCUMENTS

| | | | |
|---|---|---|---|
| 5,081,595 A | 1/1992 | Moreno et al. ............ 395/111 |
| 5,305,199 A | 4/1994 | LoBiondo ................ 364/403 |
| 5,594,529 A | * 1/1997 | Yamashita et al. ........... 399/8 |
| 5,802,420 A | * 9/1998 | Garr et al. ................ 399/27 |
| 5,930,553 A | 7/1999 | Hirst ........................ 399/8 |
| 6,366,744 B1 | * 4/2002 | Phillips et al. ............ 399/24 |
| 6,453,129 B1 | * 9/2002 | Simpson et al. ........... 399/23 |

\* cited by examiner

*Primary Examiner*—Hoan Tran
(74) *Attorney, Agent, or Firm*—Jeannette M Walder

(57) ABSTRACT

A system includes a printer having at least one container for storing a consumable and a monitor for monitoring the status of the consumable in the at least one container; a host device for sending a print job to the printer, wherein the host device includes a display; and a printer driver for controlling operation of the printer from the host device, for querying the printer for consumable status information, and for providing a user interface in the host device display; wherein the printer driver, responsive to the print job, queries the printer for consumable status information and displays the status of the consumable in the at least one container in the printer in the user interface.

14 Claims, 3 Drawing Sheets

FIG. 2
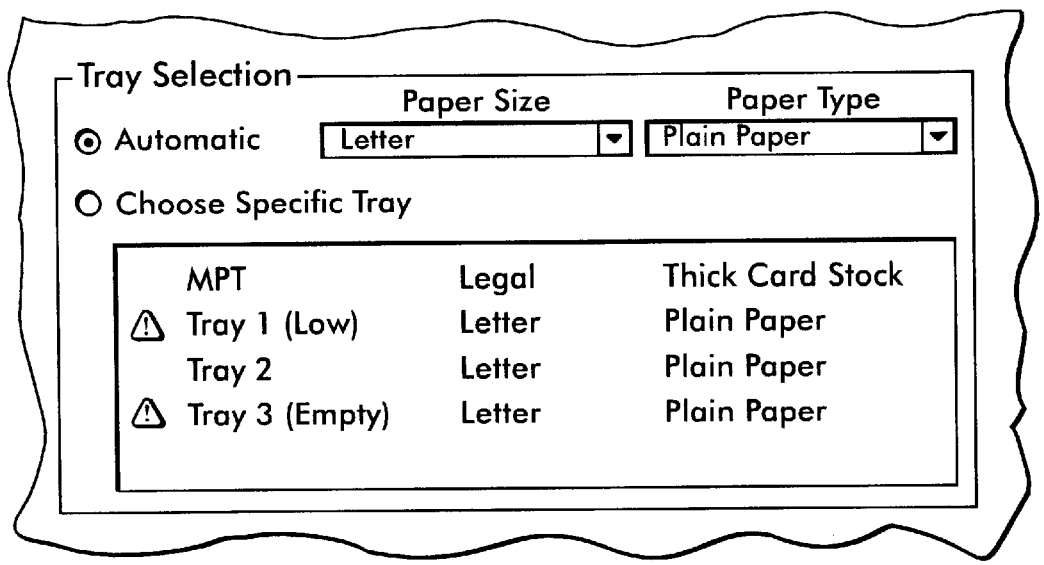
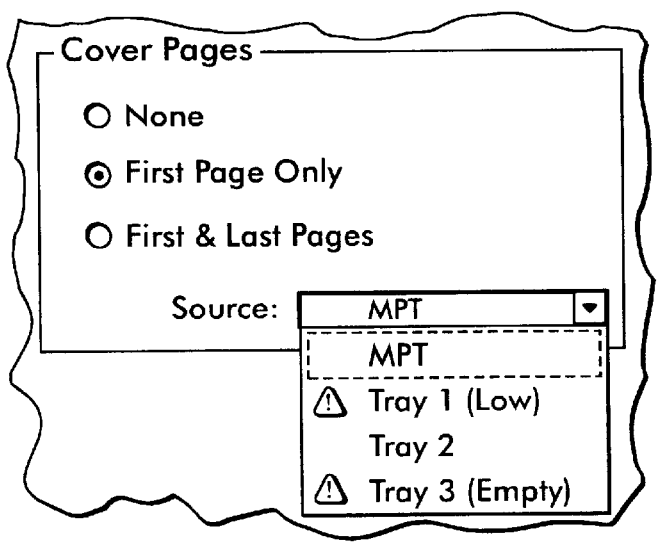
FIG. 3

PRINTER DRIVER USER INTERFACE AND SYSTEM

FIELD OF THE INVENTION

This invention relates generally to systems for providing users with status of consumables used in image forming devices, and more particularly, to a system and method which displays dynamic consumable status in a driver user interface.

BACKGROUND OF THE INVENTION

Image forming devices such as printers, copiers and multi-function devices provide users with the ability to output documents on a wide variety of different media, such as paper, transparencies, card stock, etc. Each of these image forming devices, for example, may include multiple trays for storing media. Users typically load different media in each tray and adjust the tray to accommodate the particular size and type. Some image forming devices have counters and tracking devices which count and track the quantity of media in the tray as well as when the tray is empty. Many image forming devices also have monitors for detecting the level of other consumables, such as toner or ink level in the toner or ink cartridge.

Many image forming devices also have a built-in display and/or a touch screen for providing operator input for control of the device and for displaying operating information, diagnostic results, error messages and inventory information. Inventory information may include the status of the media trays, i.e., what type of media is loaded in which tray, and ink or toner level in the different ink or toner cartridges. Error messages may include which media tray is jammed.

Some network printers, such as the Xerox Phaser printers, are provided with special software which enables a network administrator to view printer input/output tray levels. consumable status and total pages printed (information which is typically available at the printer's display). This information is available through a built-in web server installed in the printer. Network administrators can access and manage this information directly from a standard web browser or any web-enabled application.

If a user wishes to print a document at a desktop printer connected to the user's personal computer, all media and consumable information for the printer is available to the user at the printer. However, if the user wishes to print a document from a networked printer located remotely from the user, the user has no first hand knowledge of the media and consumable information from that printer.

In order to send a print job to any printer, whether it is a desktop printer connected directly to the user's personal computer or to a networked printer, a printer driver must be installed on the user's personal computer. A printer driver is software which controls the printer from the user's personal computer. The printer driver provides a user interface which may be accessed by the user through either through the operation system or an application program such as a word processing program.

A typical printer driver user interface allows a user to select items such as paper size, paper source (auto, upper, lower, manual), copy count, orientation (landscape or portrait), color or gray scale. While the printer driver user interface may allow the user to select a tray to print from, the driver does not necessarily know what trays are in the printer, or what media is in those trays. Selecting from these trays is risky for the user unless the user knows the precise configuration of that printer, and even then, the user may not know if the trays are empty or not.

Some driver user interfaces simply display the available media tray choices; some may depict certain "constrained" choices with special icons alerting the user that it was unlikely that they could select that tray. No tray status or other dynamic information is displayed. Nor does the printer driver user interface display any information pertaining to status or other dynamic information about other printer consumables, such as ink or toner.

SUMMARY OF THE INVENTION

A driver for controlling operation of an image forming device, such as a printer, having at least one container for storing a consumable and a monitor for monitoring status of the consumable in the container, according to one aspect of the invention, includes a controller, responsive to a request for an image forming job, for controlling operation of the image forming device from a host device; means, responsive to the job request, for querying the image forming device for consumable status information; and a user interface, responsive to the querying means, for displaying consumable status information.

A printer driver queries the printer for the printer's tray configuration and displays the results to the user in the driver's user-interface. This allows the user to know precisely what size and type of media is currently loaded into each tray, as well as any error status, such as being empty or jammed. The user may then use this up-to-date information during tray selection. In addition to querying for status of media, the printer driver may also query the printer for status of consumables such as toner and ink. The printer driver can query the printer for consumable status when a print job request is received, during the time the print job is completing, on a predetermined periodic basis and in response to a user input. Updated information is then displayed in the user interface to provide the user with updated information about consumables.

If a consumable container, such as a paper tray is empty, the printer driver can display an alert in the user interface. Detailed information such as container count, and for each container, media type, media size, container status and container name can be queried and the status displayed in the user interface.

A system, according to another feature of the invention, includes a printer having at least one container for storing a consumable and a monitor for monitoring the status of the consumable in the at least one container; a host device for sending a print job to the printer, wherein the host device includes a display; and a printer driver for controlling operation of the printer from the host device, for querying the printer for consumable status information, and for providing a user interface in the host device display; wherein the printer driver, responsive to the print job, queries the printer for consumable status information and displays the status of the consumable in the at least one container in the printer in the user interface.

BRIEF DESCRIPTION OF THE DRAWINGS

FIGS. 2, 3 and 4 are exemplary user interfaces.

DETAILED DESCRIPTION OF THE EMBODIMENTS

Figure 1:
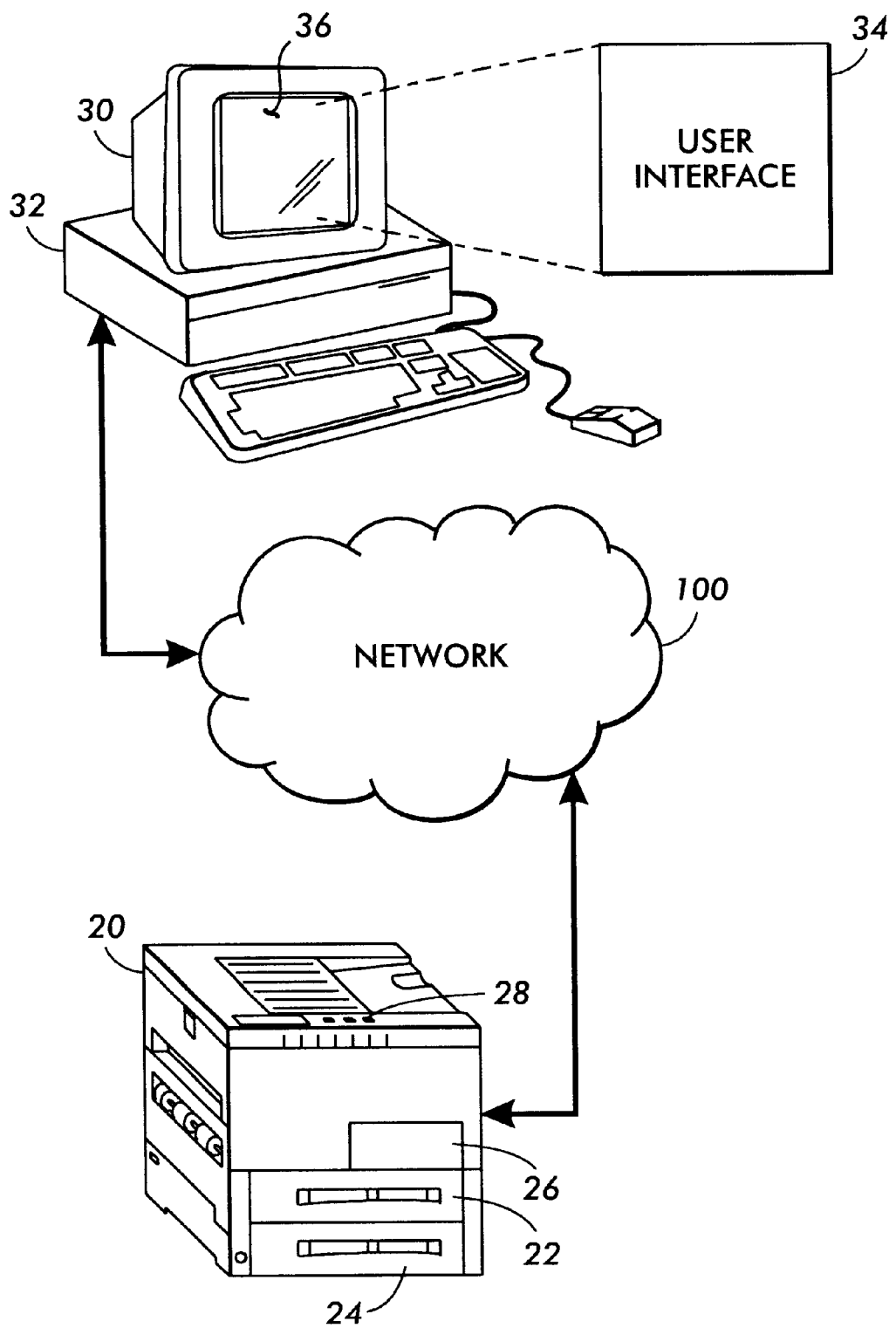
FIG. 1 is a block diagram of a system which provides a dynamic printer configuration in the printer driver user interface.
Figure 4:
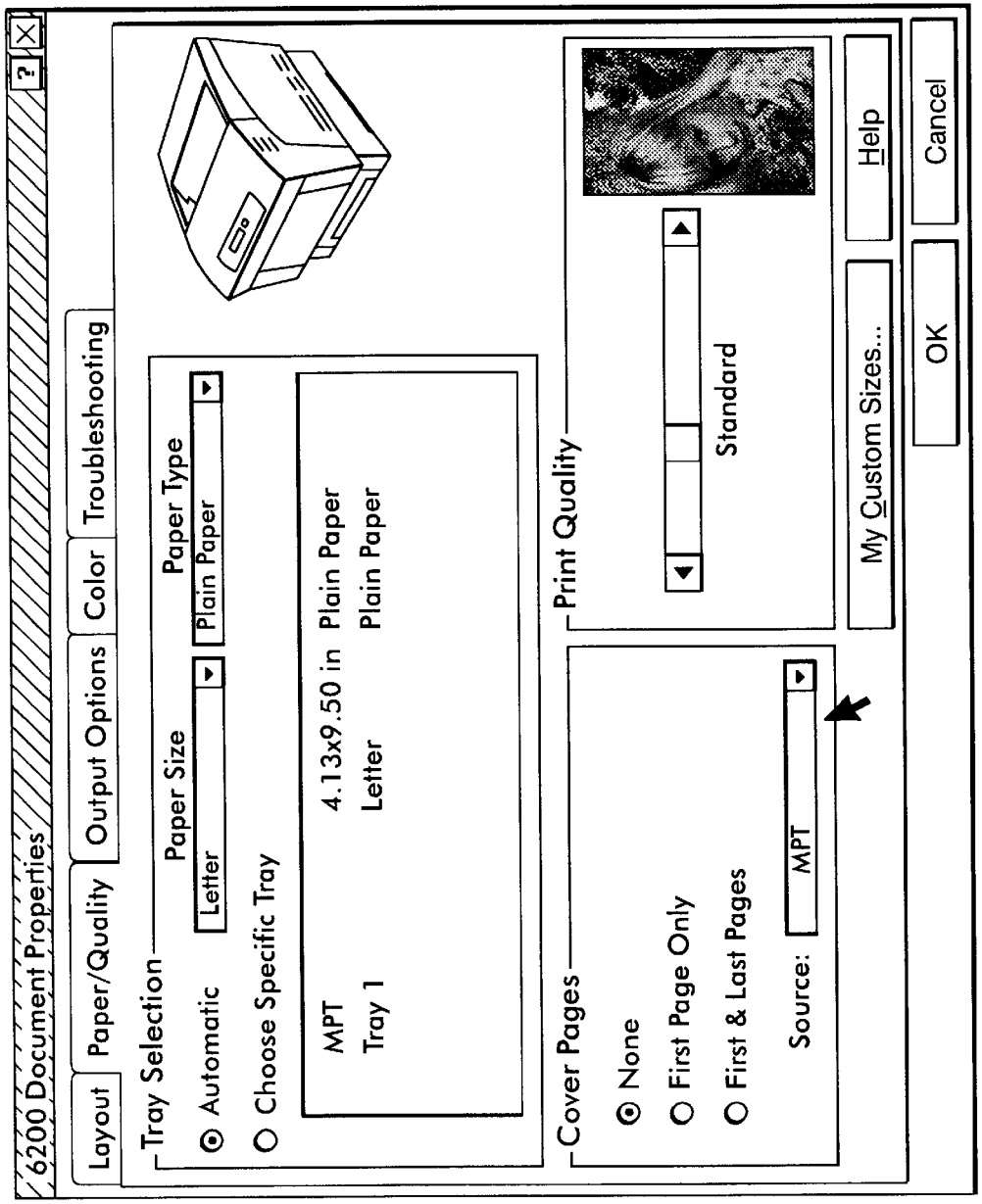

Referring to FIG. 1, system 100 includes printer 20 and host device 30. Printer 20 includes trays 22 and 24 for holding media and monitor 26 for monitoring the status of the media in each of trays 22 and 24. Monitor 26 may include sensors for detecting the level of media in each tray, sensors for detecting when a tray is empty, sensors for detecting the type of media in each tray. Alternatively, printer 20 may be configured such that the user may specify, though a panel menu 28 the type and size of media in each tray.

Host device 30, which may be a personal computer, includes a display 36. Host device 30 and printer 20 are shown as connected to a network. However, they may be directly connected to each other, such as if printer 20 were directly connected to a parallel port or USB port of host device 30.

Printer driver 32 has been installed on host device 30 and resides on the host device's hard drive. Printer driver 32 includes a controller for controlling operation of the printer from the host device 30, a query routine for querying the printer 20 for consumable status information, and a user interface 34 which displays the status in the host device display 36. When a user wants to send a print job to printer 20, the user opens the printer driver user interface 34. The printer driver user interface displays the available media trays for the printer 20, the type of media in each tray and the size of the media in the tray. Additionally, in response to the user's request for a print job (which may mean in response to opening up the printer driver user interface), the query routine queries the printer for status of the media in the printer" trays. This status information is displayed in the user interface for each media tray.

The printer driver 32 includes a query routine which can be configured to query different aspects of the printer 20. Indeed, whatever information is available about printer 20 can be queried and displayed in the printer driver user interface 34. For example, many printers provide the following information: installable options, tray count, media type (for each tray), media size (for each tray), status (for each tray) and name (for each tray). Additionally, if the printer is configured to monitor ink or toner consumables (for each container, for example, color, quantity or level, name) that information can be queried and displayed in the printer driver user interface.

If the printer 20 is directly connected to host device 30, the printer driver 32 can easily obtain this information from the printer by querying the printer through the parallel port or USB port. If the printer 20 is located on a network, the printer driver can query the printer by simply having an IP address of the printer to query the information via socket communications. Once the information is obtained, the printer drive displays it in a runtime representation of the printer in the printer driver user interface.

The query routine may be configured to query the printer when the user first opens the printer driver user interface. This provides the user with instantaneous status information. The query routine can be configured to query the printer in accordance with a predetermined period schedule. The period can be very short: seconds or fractions of seconds. Whatever information is received in response to the query routine is provided to the printer driver user interface. This provides the user with dynamic updates. Consumable status information is not statically generated at load time; it is continually monitored and refreshed within the user interface. The query routine can be configured to query the printer in response to a user input. For example, if the refresh rate is not as quick as the user would like it to be, the user can select a refresh button and the printer will be queried and the information presented in the user interface. The query routine can be configured to query during the time a print job is completing. This provides the user with real-time information if a tray becomes "low" or empty during a large print job.

The query routine may be configured such that updating occurs with minimal user interruption, so that this feature is not an annoyance, but a useful tool. The dynamic update feature of the query routine should not interfere with the user's tray selection process.

Example: A user opens the printer driver user interface and notices that Tray 2 is empty. The user wishes to print from Tray 2 because this is the tray that contains the letterhead media. Using this information, the user walks over to the printer and loads Tray 2. By the time the user returns to her desk, the user interface will reflect that Tray 2 is no longer empty. This provides her with information she may use prior to printing, to avoid having to learn that her job would not print after printing it and walking up to pick it up.

The actual implementation, presentation or display of the user interface will depend on the platform and the target audience. Consumable information may be used in many ways by the printer driver. Referring to the exemplary user interface shown FIG. 2, printer media tray selection is made using a list control and icons. This example shows how information might be presented to the user in a very visual way. In FIG. 2 the user interface indicates that the particular printer has three trays: Tray 1, Tray 2 and Tray 3 as well as a manual paper tray, MPT. The status information displayed tells the user that Tray 1 is low, Tray 3 is empty and MPT is loaded with thick card stock.

Tray selection in a more constrained environment using simple combo-box controls and text to depict current information is shown in FIG. 3. Only status of Trays 1, 2, 3 and MPT are shown; no information about type of media is shown for the selection "Cover Page." In FIG. 3, Tray 1 is indicated as being low in quantity and Tray 3 is indicated as being empty. Both Trays 1 and 3 have an alert icon next to them to alert the user of the status of these trays. Tray selection for any printer feature that needs to specify trays, such as separation pages, cover sheets, or other printer features may also be displayed in the user interface.

A more comprehensive printer driver user interface is shown in FIG. 3. A separate dialog box is shown under "Paper/Quality." Under "Automatic" tray selection, both paper size and paper type are displayed. If "Automatic" is selected, "Statement" paper size is selected. If the user wants to manually select a tray, the "Choose Specific Tray" box indicates there are only two trays on this printer: Tray 1 which has letter paper and MPT which has statement sized plain paper.

The printer driver can be configured such that the printer driver user interface eliminates all tray selection constraints. For example, if Tray 3 is shown as empty, the printer driver can be configured so that the user cannot select Tray 3 until Tray 3 has been loaded with media. By only showing the valid selections, the user is much less likely to err during tray selection, and much more likely to get the desired output.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system comprising:
a printer having a plurality of media containers and a monitor for monitoring the status of the media in each of the plurality of media containers;
a host device for sending a print job to the printer, wherein the host device includes a display; and
a printer driver for controlling operation of the printer from the host device, for querying the printer for container information, and for providing a user interface in the host device display;
wherein the printer driver, responsive to the print job, queries the printer for information pertaining to container count, and for each container, media type, media size, container status and container name;
wherein the printer driver displays media type, media size, container status and container name for each printer container in the user interface for selection by the user; and
wherein the printer driver, responsive to a container status of empty or jammed, constrains the container from selection by the user.

2. The system of claim 1, wherein the printer driver, while the print job is printing, queries the printer for media status information and displays the status of the media in each container in the printer in the user interface.

3. The system of claim 1, wherein the printer driver, responsive to a user request, queries the printer for media status information, and displays the status of the media in each container in the printer in the user interface.

4. The system of claim 1, wherein the printer driver, queries the printer for media status information in accordance with a predetermined periodic schedule and displays the status of the media each container in the printer in the user interface.

5. The system of claim 1, wherein the printer further includes a plurality of ink containers and wherein the monitor monitors the status of ink in the plurality of ink containers.

6. The system of claim 1, wherein the printer further includes a plurality of toner containers and wherein the monitor monitors the status of toner in the plurality of toner containers.

7. The system of claim 1, wherein the printer driver provides the user interface in an application program user interface.

8. The system of claim 7, wherein the printer driver queries the printer on a predetermined, periodic basis; and wherein the printer driver is configured to provide updated information in the application program user interface.

9. The system of claim 1, wherein the printer driver displays low media alerts in the user interface.

10. The system of claim 1, wherein the host device comprises a personal computer and both the host device and the printer are connected on a network.

11. A driver for controlling operation of an image forming device having at least one container for storing media and a monitor for monitoring status of the media in the container, comprising:
a controller, responsive to a request for an image forming job, for controlling operation of the image forming device from a host device;
means, responsive to the job request, for querying the image forming device for information pertaining to container count, and for each container, media type, media size, container status and container name; and
a user interface, responsive to the querying means, for displaying media type, media size, container status and container name for each container in the user interface for selection by the user;
wherein, responsive to a container status of empty or jammed, that container is restrained from selection by the user in the user interface.

12. The driver of claim 11, wherein the querying means queries the printer on a predetermined, periodic basis and the user interface displays the updated container status information.

13. The driver of claim 11, wherein the querying means, responsive to a user request, queries the printer for container status information and the user interface displays the container status information.

14. The driver of claim 11, wherein the user interface displays low media alerts.

* * * * *

UNITED STATES PATENT AND TRADEMARK OFFICE
CERTIFICATE OF CORRECTION

PATENT NO. : 6,748,183 B2
DATED : June 8, 2004
INVENTOR(S) : Jonathan A. Edmonds It is certified that error appears in the above-identified patent and that said Letters Patent is hereby corrected as shown below:

<u>Title page,</u>
Item [75], Inventor, delete "Johnathan A. Edmonds" and insert -- Jonathan A. Edmonds --.

Signed and Sealed this

Eighteenth Day of January, 2005

JON W. DUDAS
*Director of the United States Patent and Trademark Office*